United States Patent [19]
Blumberg et al.

[11] Patent Number: 5,457,346
[45] Date of Patent: Oct. 10, 1995

[54] WINDMILL ACCELERATOR

[76] Inventors: Stanley Blumberg, 600 Reisterstown Rd., Baltimore, Md. 21028; Anthony R. Wells, P.O. Box 219, The Plains, Va. 22171

[21] Appl. No.: 207,101

[22] Filed: Mar. 8, 1994

Related U.S. Application Data

[63] Continuation of Ser. No. 833,219, Feb. 10, 1992, abandoned.

[51] Int. Cl.$^6$ .................................................... F03D 11/00
[52] U.S. Cl. .................. 290/55; 290/44; 415/4.1; 415/4.3; 415/4.5
[58] Field of Search .................. 290/44, 55; 415/4.1, 415/4.3, 4.5

[56] References Cited

U.S. PATENT DOCUMENTS

| | | | |
|---|---|---|---|
| 756,372 | 4/1904 | Johnson | 415/4.3 |
| 2,517,135 | 8/1950 | Rudisill | 290/44 |
| 4,410,806 | 10/1983 | Brulle | 290/44 |

FOREIGN PATENT DOCUMENTS

| | | | |
|---|---|---|---|
| 57-62972 | 4/1982 | Japan | 415/4.5 |

*Primary Examiner*—Steven L. Stephan
*Assistant Examiner*—Robert Lloyd Hoover
*Attorney, Agent, or Firm*—Lowe, Price, LeBlanc & Becker

[57] ABSTRACT

An accelerator for a windmill structure as described which is a frustro-conical funnel-like device intended to direct a stream of wind therethrough onto the impeller of a windmill. As the wind passes through the device, it is constricted whereby the velocity increases and exits a throat-like outlet as a diverging jet impacting the impeller blades to thereby increase the kinetic energy available to be converted to mechanical or electrical energy by said windmill. The device of this invention can include a vane for maintaining the accelerator facing into the wind with the windmill, a mounting platform for either the accelerator or both accelerator and the windmill, and an internal configuration to said accelerator to impart a swirling spiral motion to the wind passing therethrough as it is constricted.

9 Claims, 3 Drawing Sheets

5,457,346

WINDMILL ACCELERATOR

This application is a continuation of application Ser. No. 07/833,219 filed Feb. 10, 1992, now abandoned.

FIELD OF THE INVENTION

This invention relates to a device for improving the efficiency of wind driven turbines and in particular to an accelerator to be mounted on conventional windmills to improve the efficiency thereof.

DESCRIPTION OF THE PRIOR ART

Windmills and other wind driven devices have been in use for centuries to convert the kinetic energy of wind to mechanical or electrical energy. As described, for example, in U.S. Pat. No. 4,320,304, the recoverable kinetic energy is proportional to the third power of the wind velocity or speed. Thus, doubling the air speed will increase the recoverable kinetic energy eight times. However, there are generally acknowledged minimum wind speeds which will result in recoverable energy due to friction. It is generally acknowledged that a wind speed of five meters per second or about 15 miles per hour is required in order to make energy recovery economically feasible. In many areas of the world, the predominant wind speed is at or only slightly above the level required for economical energy recovery and, therefore, wind energy has not been harnessed effectively.

Windmills have also been used for many years on the great plains to pump water, or as an auxiliary power source to lessen reliance upon fossil fuels. Such wind driven turbine structures suffer from the above problem in that there is a minimum wind speed below which energy recovery is not feasible.

In the above referenced patent, it was attempted to utilize Venturi-type technology whereby a throat was created with the turbine at the minimum construction. Air entering the device then would be accelerated as it passed through the throat and a suction would be created downstream of the throat to further increase the kinetic energy to be recovered. The device, however, was primarily intended to dissipate turbulent eddies which form as the air currents are compressed into the throat and expand downstream of the throat by the use of pathways for leaking said eddie currents. This results in a very complicated structure not suitable for commercial utilization.

Similarly, in U.S. Pat. No. 2,517,135 a funnel type accelerator was proposed for driving a turbine which would then convert the kinetic energy of the wind to electrical energy. This patent, however, was generally directed to protecting the turbine in the case of excessive velocity and the design included a turbine having blades contained in radial planes about a central axis which, in turn, was mounted on an energy recovery device or by the turbine would be turned partially out of the wind, or rotation stopped to protect the turbine from excessive wind speeds or rotational energy.

Similar devices are disclosed in U.S. Pat. Nos. 3,883,750 and 4,508,973 wherein a Venturi effect is created by a constriction wherein a turbine or fan is disposed at the constriction. In these devices, the fan is disposed within a structure which incorporates an expanded entrance which constricts to the throat, followed downstream by an expansion section. Acceleration is achieved by the constriction of the frustro-conical entrance section, coupled with the downstream partial vacuum created by expansion of the airstream after it passes through the throat.

These prior devices then involve very complicated structures which are not readily adaptable to improving the efficiency of existing turbines.

SUMMARY OF THE INVENTION

It has been discovered that a frustro-conical accelerator can be used to improve the efficiency of wind driven turbines such as windmills by eliminating the downstream expansion section and further by creating a swirling effect in a frustro-conical or funnel like accelerator whereby the kinetic energy of the wind is dramatically increased as it impacts upon the impeller blades to drive the turbine at a greater than normal speed.

In an embodiment of this invention, the windmill or turbine with the accelerator of this invention could be mounted on a platform for rotation so that both the accelerator and the turbine automatically rotate into the wind as it changes directions.

In yet another embodiment of this invention, the accelerator could be mounted on an existing windmill. The accelerator could have limited rotational movement so that minor variations in the wind direction will cause movement of the accelerator without movement of the windmill itself or the two could rotate together only a limited distance where the wind is predominantly from one direction such as from the north.

Accordingly, it is an object of this invention to provide an accelerator which may be mounted on a conventional wind turbine or windmill to improve the efficiency thereof.

It is yet another object of this invention to provide a windmill accelerator which will concentrate the wind impinging upon the impeller blades by directing the wind through a constricted throat in front of the blades whereby the immediate expansion of the wind passing through the throat imparts an increased rotation energy on the turbine or windmill.

It is yet another object of this invention to describe an accelerator for a windmill which may be mounted upon a gimbal or similar structural device whereby the accelerator and the windmill are capable of rotating up to 360° to take into account changes in wind direction so that the windmill and accelerator are always facing into the wind.

It is still another object of this invention to provide an accelerator for a windmill which will cause the wind entering a funnel-like frustro-conical device to both increase in velocity and to swirl in a spiral or whirlpool effect whereby as it passes through the throat and impinges upon the blades, it will both be accelerating and imparting an angular momentum to the blades to increase the kinetic energy thereof.

It is still another object of this invention to provide for the accelerator to be positioned at a distance relative to the windmill so that the wind force is optimized. To this end the structure will allow the distance of the accelerator from the windmill to be varied.

These and other objects will become readily apparent with reference to the drawings and following description wherein:

DETAILED DESCRIPTION OF THE INVENTION

Figure 1:
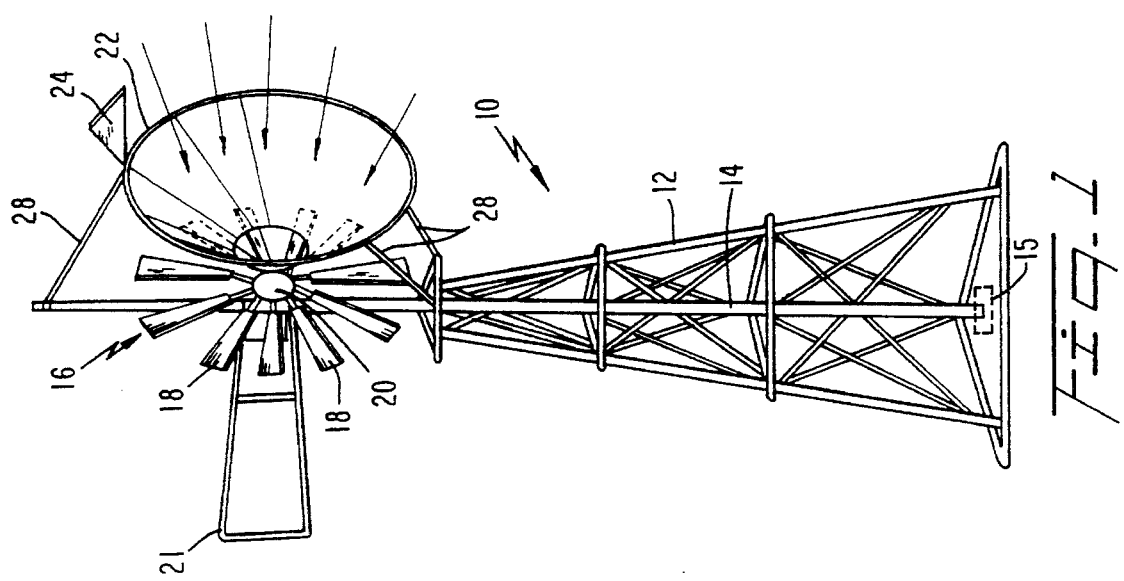
FIG. 1 is a perspective view of a conventional windmill having an embodiment of the accelerator of this invention mounted thereon.

With attention to FIG. 1, there is a representation of a conventional windmill. It will be understood that windmill 10 is a representation only and is intended to be a generic representation for wind driven turbine type machines.

Windmill 10 in its conventional form will be on an elevated structure 12 having a central drive shaft 14 wherein rotational energy of the impeller 16 is translated to rotation of shaft 14 through a conventional gearbox (not shown). The impeller 16 consists of a plurality of radial, pitched blades 18 mounted on a central hub 20. Typically, a tail 21 is provided and the impeller 16 has a limited degree of rotational movement about the shaft 14. In this way, if the wind direction varies a few degrees, tail 21 will urge the impeller into the wind. In this way, so long as the wind is in a predominant direction, the tail 21 will assist in minor adjustments to cause the impeller 16 to face directly into the wind.

It will be obvious to those skilled in the art that the rotation of shaft 14 can be used to accomplish a variety of conventional functions from mechanical work to driving a electrical generator shown as reference No. 15, for example in FIG 1. The rotational energy of the impeller 16 then is intended to be translated into any desired conventional form of energy, whether mechanical or electrical, without limitation of the instant invention.

It has been discovered that the efficiency of the windmill 10 can be dramatically increased by providing a funnel or frustro-conical type accelerator 22 to modify the velocity in flow configuration of the wind impacting the blades 18 to impart greater energy thereto. The funneling and directing of the wind then increases the energy in the stream impacting the impeller 16. This increased energy is translated into the ability to do greater work through the output of shaft 14 than would be accomplished without the accelerator 22 of this invention. The result, in effect, is the ability to extract greater energy from wind of a given velocity than would be available by the windmill 10 without the device of this invention. This improved efficiency can, as will be obvious to those skilled in the art, render marginal situations such as where the predominant wind velocity is at or below the normally economically recoverable rate, economically feasible. Furthermore, the cost of securing the greater or more efficient output is basically a one time charge for the cost of constructing the accelerator of this invention.

The frustro-conical or funnel-like configuration is intended so that the device 22 can be mounted on any conventional wind turbine or windmill type device without a large installation or complicated construction procedure. It has been discovered that by merely using the converging section of a Venturi tube and adapting the same to a windmill, efficiency thereof is greatly improved, and by eliminating the conventional diverging section of the Venturi, the marginal economic loss is more than offset by the simplification of a very complicated structure. In other words, to achieve a full Venturi effect the windmill would have to be enclosed basically in a tunnel type structure with the windmill located at the throat. However, it has been discovered that such a tunnel structure is not necessary and the vast majority of the benefits achieved by the Venturi effect can be achieved by utilizing the frustro-conical converging section only according to this invention.

Figure 2:
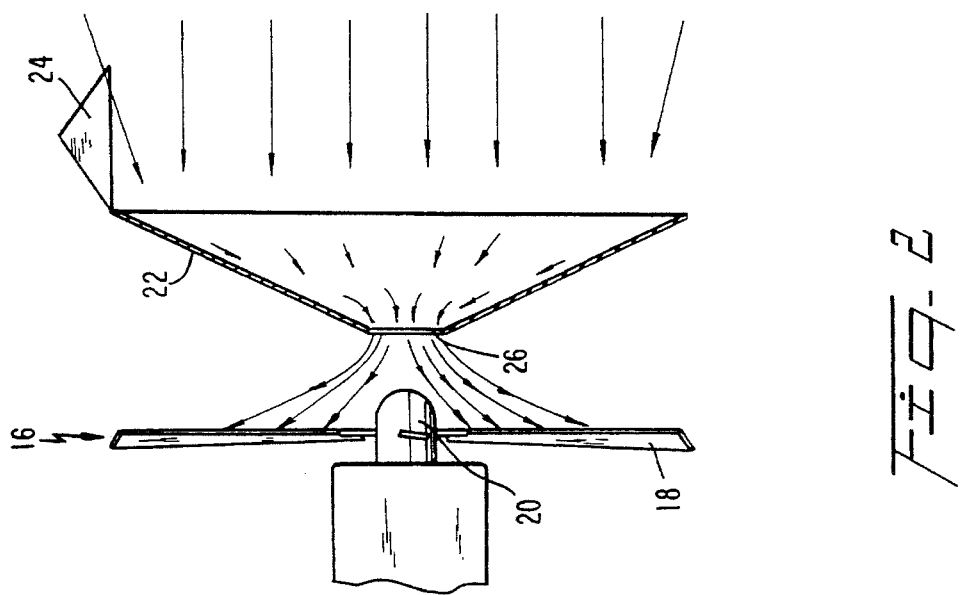
FIG. 2 is a fragmentary side view of the accelerator and windmill of this invention with support members deleted for clarity.

With attention to FIG. 2, the accelerator 22 of this invention, preferably is of rigid metal material and preferably is mounted on the windmill 10 with its central axis coinciding with the axis of rotation of the windmill impeller 16. In this way the pitch of the blades 18, which in a typical windmill structure is fixed can be utilized to the maximum ability of the structure. As shown in FIGS. 1 and 2, a wind sail or wind vane 24 may be provided on a rotating structure to function similarly to the tail 21 on the impeller 16. Both the impeller 16 and the accelerator 22 should face as closely as possible into the wind and to ensure that minor variation in wind direction of a few degrees, will be compensated for by movement of the accelerator As shown in FIG. 2, the impeller 16 has radial vanes 18 which are contained in a first vertical plane and the accelerator structure 22 as at throat 26 which is contained in a second vertical plane. The second vertical plane is disposed upstream of the first vertical plane and the impeller hub 20 so that the first and second vertical planes are mutually spaced and the hub 20 is disposed downstream of the throat 26. As also shown in the drawings, the diameter of the throat 26 is substantially larger than that of the impeller of 20.

It is important that the accelerator 22 is closely spaced to the impeller 16 as shown in FIG. 2. The close spacing, as will be determined by those skilled in the art, is to ensure stability of the accelerator structure on the windmill structure. The wind entering accelerator 22 converges and exits the opening 26 in a diverging jet of turbulent air. This jet will then impact the individual blades 18 driving the impeller 16, and the close spacing of accelerator 20 and impeller 16 facilitates the efficiency of this impact. As shown in FIG. 1, upper and lower supports 28 may be provided as will be obvious to those skilled in the art or any other type of conventional supports. The supports 28 then are merely examples of possible mounts within the scope of this invention. The distance of the accelerator relative to the windmill may be varied by sliding it along a track and then securing it, thereby optimizing the wind force acting on the windmill.

In the preferred embodiment of this invention, the accelerator has a frustro-conical configuration. In the preferred embodiment, the angle of the sides to the central axis is 69° ± up to 2°. The central axis then is defined as the axis of rotation of the trapezoid which would produce the frustro-conical shape shown. As noted above, the central axis of the frustro-conical accelerator should coincide with the axis of rotation of the impeller 16.

Figure 3:
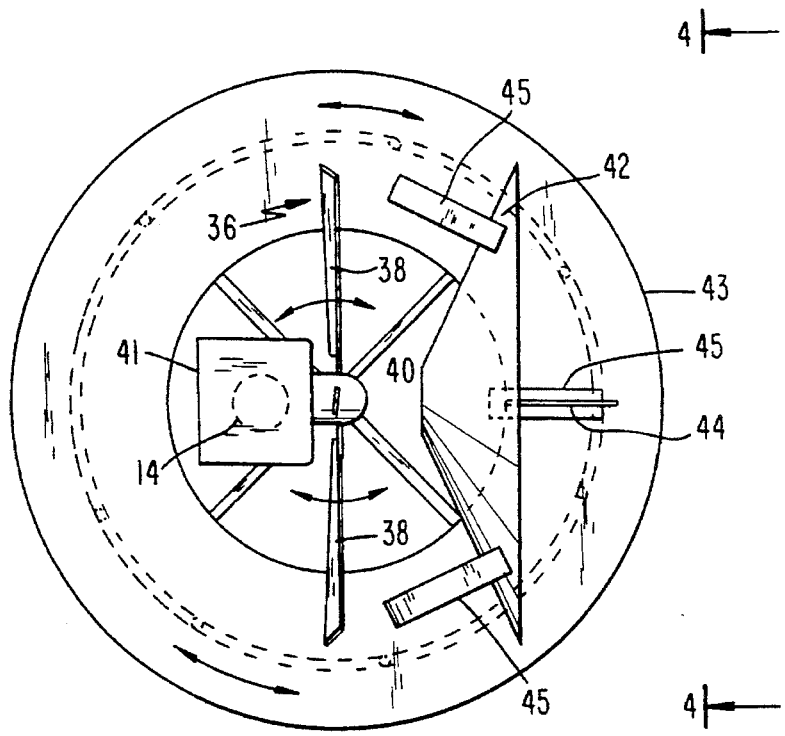
FIG. 3 is a plan view of a windmill with the accelerator of this invention mounted on a gimbal or platform for rotational movement.
Figure 4:
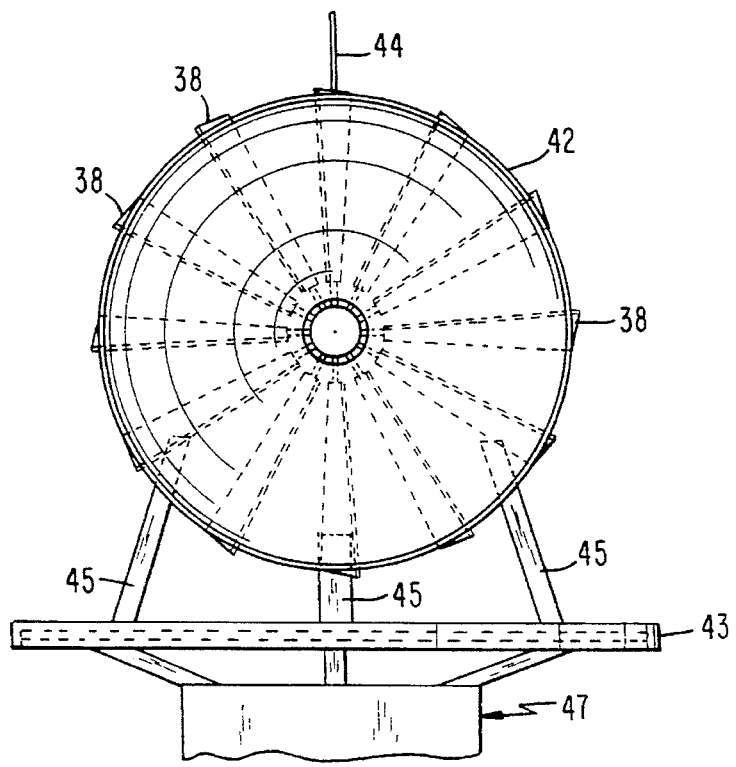
FIG. 4 is a front view of the device of FIG. 3.

With reference to FIGS. 3 and 4, in another embodiment of this invention, the impeller 36 having pitched blades 38 may be rotatably mounted horizontally about the output shaft 14. A conventional gearbox 41 coupled to the hub 40 of impeller 36 translates the rotational energy of the impeller 36 into rotational energy for the shaft 14 which, in turn, then does the desired work as will be obvious to those skilled in the art. The accelerator 42 is a frustro-conical structure as previously described which has a central axis normally mounted coincident with the central axis of hub 40 or the axis of rotation of impeller 36. In this instance, however, a gimbal-like platform 43 is provided which mounts accelerator 42 by, for example, conventional supports 45. A vane 44 also could be provided, if desired, to assist in rotational movement of the accelerator.

In this embodiment, the accelerator and windmill could rotate in response to changes in wind direction driven by the action of the wind on, for example, vane 44 whereby the platform 43 would rotate relative to a support structure of conventional design 47. In this embodiment, it is intended that the windmill 36 and accelerator 42 rotate together into the wind. As will be obvious to those skilled in the art, the windmill could also have the conventional tail 21 shown in FIG. 1. In the alternative, an anemometer could be provided and the platform 43 could be rotated by a servo motor independent of the windmill 36 and accelerator 42.

As will also be obvious to those skilled in the art, if the windmill 36 is separately rotatable, the accelerator 42 only could be mounted on the gimbal-like structure 43 and cause to rotate independently of the windmill 36. The central axis of the accelerator 42 should be maintained substantially coincident with the axis of rotation of the impeller 36.

In other words, in this embodiment, both the windmill and the accelerator can be mounted on a support structure which rotates, or the accelerator and the windmill can be separately mounted on the rotating support structures. The design of the same then is considered to be within the skill of an ordinary practitioner in the art. Rotation of the accelerator and/or the windmill may be achieved by the use of one or more vanes in the conventional fashion, or may be done independently thereof by use of an anemometer type device which controls a servo motor in the conventional manner also obvious to those skilled in the art.

Figure 5:
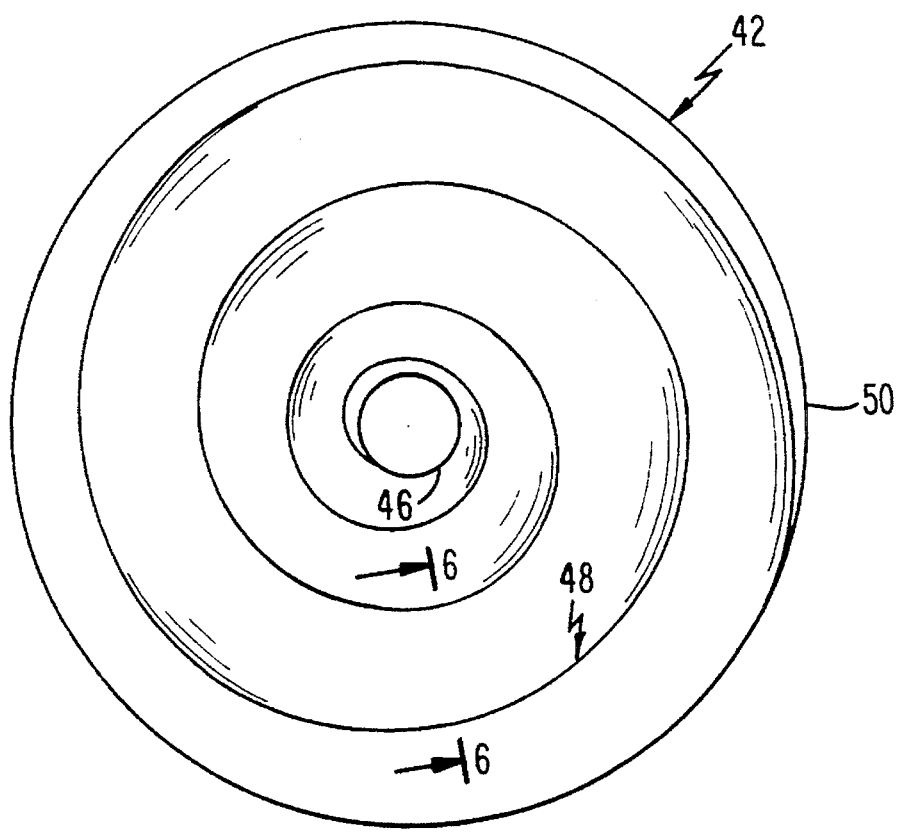
FIG. 5 is a front view looking into an embodiment of the device of this invention illustrating a spiral configuration.

With attention to the embodiment of FIG. 5, FIG. 5 is a view looking into the accelerator 42 in the direction of the wind passing therethrough through opening 46.

Figure 6:
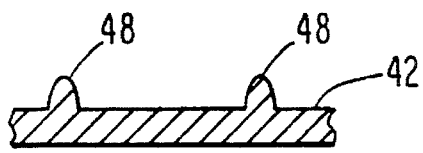
FIG. 6 is a cross-sectional view taken along line 6—6 of FIG. 5.

The interior of accelerator 42 in this embodiment is intended to impart a swirling pattern to the flow of wind passing therethrough and according, a spiral edge 48 is raised which travels from the peripheral portion of the accelerator 50 to the outlet 46. This raised edge may, in effect, provide a scoop-like structure or baffel to impart a whirlpool-type spiraling motion to the flow of wind. A radial cross section of accelerator 42 as shown in FIG. 6 exhibits a U-shaped or a wavelike pattern with the peaks defined by the edge 48 of this spiral design shown. In this way, with reference to, for example, FIG. 2, the accelerator wall itself increases the velocity of the wind therein as the cross section decreases, and the spiral edge 46 imparts a swirling pattern so that the wind exiting the outlet 26 or 46 has a swirling motion intended to impact the blades 18 at an angle thereto to thereby take maximum advantage of the pitch of the individual blades. As will be obvious to those skilled in the art, if the wind impacts the blades at a substantially perpendicular angle while rotating, the rotational force exerted on the central hub of the impeller will be maximized.

In summary, the device of this invention is intended to be adaptable to conventional wind turbines or windmills of a wide variety of different designs whereby the efficiency thereof may be improved. As is well known to those skilled in the art, windmills as power sources are not in general use because the predominant winds in many areas are not at a velocity high enough to economically generate power or do work. By utilizing the instant invention; the efficiency can be sufficiently increased to make such devices much more generally economically feasible.

It is desired according to the device of this invention to provide a structure which minimizes the construction requirements to take advantage of only a constricting section of frustro-conical design to accelerator in Venturi fashion the flow of wind impacting the impeller of the wind turbine. The downstream diverging section of a Venturial conventional design is not a part of the instant invention.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

We claim:

1. In a windmill assembly for converting kinetic energy of wind driving an impeller to mechanical or electrical energy, said impeller including a plurality of radial vanes extending outwardly from a central hub, said impeller contained in a first vertical plane the improvement comprising:

an accelerator structure disposed immediately up stream of said impeller for increasing the velocity of the wind driving said impeller and the mechanical or electrical energy generated thereby, said accelerator consisting of a substantially frustro-conical, funnel-like structure having an upstream entrance and a downstream throat where accelerated wind exits said throat being contained in a second vertical plane spaced horizontally away from the first vertical plane and having a diameter substantially greater than that of the impeller hub but substantially less than said impeller, said structure mounted upstream of said impeller and hub and spaced away therefrom, said accelerator having a central axis which is the axis of rotation of the trapezoid which defines the frustro-conical shape thereof means for substantially aligning the central axis of said accelerator and the axis of rotation of said impeller and maintaining said alignment against a shifting in wind direction so that wind entering said accelerator is constricted as it passes therethrough to exit the throat as a high velocity, diverging jet, impacting said impeller to drive the same, the frustro-conical sides of said accelerator defining an angle of about 69+ up to 2 degrees with the central axis thereof, and means carried by said accelerator for imparting a spiral flow to the wind passing therethrough.

2. The device of claim 1 wherein said impeller and accelerator are mutually rotatable horizontally relative to each other and said alignment means includes a vane mounted on each, each vane being contained in the plane which contains, respectively, the axis of rotation of said impeller or the central axis of said accelerator.

3. The device of claim 1 wherein said impeller and accelerator are coupled together and said alignment means includes means for aligning said axes of both in the direction of the wind, said means including at least one vane contained in the plane containing said axes.

4. The device of claim 1 wherein said alignment means includes a sensor for sensing change in wind direction and means for aligning said axes in said direction.

5. The device of claim 1 wherein the interior surface of said accelerator defines a raised spiral edge extending from the inlet to the outlet.

6. The device of claim 1 wherein the interior surface of said accelerator defines a spiral baffel extending from the inlet to the outlet.

7. The device of claim 6 wherein said spiral baffel is inwardly raised to define a spiral U-shaped scoop extending from the inlet to the outlet of said accelerator.

8. In a windmill for converting kinetic energy of wind driving an impeller to mechanical or electrical energy, said impeller including a plurality of radial vanes extending outwardly from a central hub, said impeller contained in a vertical plane the improvement comprising:

an accelerator structure disposed immediately up stream of said impeller for increasing the velocity of the wind driving said impeller and the mechanical or electrical energy generated thereby, said accelerator consisting of a substantially frustro-conical, funnel-like structure having an upstream entrance and a downstream throat where accelerated wind exists said structure mounted upstream of said impeller and spaced away therefrom, said throat being contained in a second vertical plane spaced horizontally away from the first vertical plane and the hub and having a diameter substantially greater than that of said impeller hub but less than that of said impeller, said accelerator having a central axis which is the axis of rotation of the trapezoid which defines the frustro-conical shape thereof means for substantially aligning the central axis of said accelerator and the axis of rotation of said impeller and maintaining said alignment against a shifting in wind direction so that wind entering said accelerator is constricted as it passes therethrough to exit the throat as a high velocity, diverging jet, impacting said impeller to drive the same, the frustro-conical sides of said accelerator defining an angle of about 69+ up to 2 degrees with the central axis thereof; and means carried by said accelerator for imparting a spiral flow the wind passing therethrough; and a horizontal mounting platform supporting said accelerator and surrounding said impeller, said accelerator being rotatable mounted horizontally on said platform.

9. The device of claim 8 wherein said impeller is rotatably coupled to said platform.

* * * * *